US011093155B2

United States Patent
Anchi et al.

(10) Patent No.: US 11,093,155 B2
(45) Date of Patent: Aug. 17, 2021

(54) AUTOMATED SEAMLESS MIGRATION WITH SIGNATURE ISSUE RESOLUTION

(71) Applicant: EMC IP Holding Company LLC, Hopkinton, MA (US)

(72) Inventors: Amit Pundalik Anchi, Bangalore (IN); Vinay G. Rao, Bangalore (IN); Sanjib Mallick, Bangalore (IN); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 90 days.

(21) Appl. No.: 16/710,828

(22) Filed: Dec. 11, 2019

(65) Prior Publication Data
US 2021/0181965 A1    Jun. 17, 2021

(51) Int. Cl.
*G06F 11/14*    (2006.01)
*G06F 3/06*    (2006.01)

(52) U.S. Cl.
CPC ............ *G06F 3/0647* (2013.01); *G06F 3/061* (2013.01); *G06F 3/067* (2013.01); *G06F 3/0659* (2013.01); *G06F 3/0664* (2013.01); *G06F 11/1456* (2013.01)

(58) Field of Classification Search
None
See application file for complete search history.

(56) References Cited

U.S. PATENT DOCUMENTS

| | | | |
|---|---|---|---|
| 6,567,397 B1 | 5/2003 | Campana et al. | |
| 6,687,746 B1 | 2/2004 | Shuster et al. | |
| 6,697,875 B1 | 2/2004 | Wilson | |
| 7,454,437 B1 | 11/2008 | Lavallee et al. | |
| 7,617,292 B2 | 11/2009 | Moore et al. | |
| 7,770,053 B1 | 8/2010 | Bappe et al. | |
| 7,809,912 B1 | 10/2010 | Raizen et al. | |
| 7,818,428 B1 | 10/2010 | Lavallee et al. | |
| 7,904,681 B1 | 3/2011 | Bappe et al. | |
| 7,925,872 B2 | 4/2011 | Lai et al. | |

(Continued)

OTHER PUBLICATIONS

Kris Piepho, "Dell EMC SC Series Storage: Microsoft Multipath I/O," Dell EMC Best Practices, Jan. 2017, 57 pages.
NVM Express, "NVM Express, Revision 1.3," NVM Express, May 1, 2017, 282 pages.
VMWARE, "Multipathing Configuration for Software iSCSI Using Port Binding," Technical White Paper, Apr. 25, 2012, 15 pages.

(Continued)

*Primary Examiner* — Brian R Peugh
(74) *Attorney, Agent, or Firm* — Ryan, Mason & Lewis, LLP

(57) ABSTRACT

An apparatus comprises at least one processing device comprising a processor coupled to a memory. The processing device is configured to control performance of a migration process in which a source logical storage device of a first storage system is migrated to a target logical storage device of a second storage system. In conjunction with the migration process, the processing device is further configured to update a management header of the target logical storage device to include an identifier of the target logical storage device, to store an identifier of the source logical storage device, and responsive to a read of the management header of the target logical storage device, to return the identifier of the source logical storage device in place of the identifier of the target logical storage device. Other illustrative embodiments include methods and computer program products.

20 Claims, 3 Drawing Sheets

(56) References Cited

U.S. PATENT DOCUMENTS

| | | | |
|---|---|---|---|
| 8,285,825 | B1 | 10/2012 | Nagaraj et al. |
| 8,825,919 | B1 | 9/2014 | Lim et al. |
| 8,874,746 | B1 | 10/2014 | Gonzalez |
| 9,026,694 | B1 | 5/2015 | Davidson et al. |
| 9,092,158 | B2 * | 7/2015 | Nakagawa ............ G06F 3/0604 |
| 9,400,611 | B1 | 7/2016 | Raizen |
| 9,594,780 | B1 | 3/2017 | Esposito et al. |
| 9,647,933 | B1 | 5/2017 | Tawri et al. |
| 9,778,852 | B1 | 10/2017 | Marshak et al. |
| 10,289,325 | B1 | 5/2019 | Bono |
| 10,353,714 | B1 | 7/2019 | Gokam et al. |
| 10,439,878 | B1 | 10/2019 | Tah et al. |
| 10,474,367 | B1 | 11/2019 | Mallick et al. |
| 10,476,960 | B1 | 11/2019 | Rao et al. |
| 2002/0103923 | A1 | 8/2002 | Cherian et al. |
| 2004/0010563 | A1 | 1/2004 | Forte et al. |
| 2006/0277383 | A1 | 12/2006 | Hayden et al. |
| 2008/0043973 | A1 | 2/2008 | Lai et al. |
| 2011/0145495 | A1 * | 6/2011 | Yamamoto .............. G06F 3/067 711/112 |
| 2011/0197027 | A1 | 8/2011 | Balasubramanian et al. |
| 2011/0296230 | A1 | 12/2011 | Chen et al. |
| 2013/0117766 | A1 | 5/2013 | Bax et al. |
| 2015/0222705 | A1 | 8/2015 | Stephens |
| 2016/0092136 | A1 | 3/2016 | Balakrishnan et al. |
| 2016/0117113 | A1 | 4/2016 | Li et al. |
| 2016/0335003 | A1 | 11/2016 | Ahmed et al. |
| 2017/0235507 | A1 | 8/2017 | Sinha et al. |
| 2018/0189635 | A1 | 7/2018 | Olarig et al. |
| 2019/0095299 | A1 | 3/2019 | Liu et al. |
| 2019/0108888 | A1 | 4/2019 | Sarkar et al. |

OTHER PUBLICATIONS

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMWARE, Inc. "VMware VMFS Volume Management," 2009, 8 pages.

U.S. Appl. No. 15/795,653 filed in the name of Maneesh Pusalkar et al. Oct. 27, 2017 and entitled "Storage System with Network-Wide Configurable Device Names."

U.S. Appl. No. 16/142,274 filed in the name of Sanjib Mallick et al. Sep. 26, 2018 and entitled "Host Device with Multi-Path Layer Implementing Automatic Standby Setting for Active-Active Configuration."

U.S. Appl. No. 16/694,291 filed in the name of Amit Pundalik Anchi et al. Nov. 25, 2019 and entitled "Host Device with Multi-Path Layer Implementing Efficient Load Balancing for Active-Active Configuration."

U.S. Appl. No. 16/697,393 filed in the name of Vinay G. Rao et al. Nov. 27, 2019 and entitled "Automated Seamless Migration of Logical Storage Devices."

* cited by examiner

AUTOMATED SEAMLESS MIGRATION WITH SIGNATURE ISSUE RESOLUTION

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations for delivery to storage ports of the storage system. Different ones of the host devices can run different applications with varying workloads and associated IO patterns. Such host devices also generate additional IO operations in performing various data services such as migration. However, migration of logical storage volumes or other logical storage devices from one storage system to another storage system using conventional approaches can lead to problems. For example, in automated seamless migration processes that do not implement so-called "spoofing" of source logical storage device identifiers by corresponding target logical storage devices, file system signature issues can arise when two different device identifiers for respective source and target devices are detected as having the same file system signature, leading a host device to mark one of them as a copy of the other. Such file system signature issues of conventional approaches can negatively impact the migration process and thereby degrade overall system performance. Accordingly, a need exists for improved migration techniques that can avoid such drawbacks of conventional approaches.

SUMMARY

Illustrative embodiments provide techniques for signature issue resolution in automated seamless migration of logical storage volumes or other types of logical storage devices between storage systems. Some embodiments can advantageously eliminate the problems that might otherwise arise in automated seamless migration processes that do not implement spoofing of source logical storage device identifiers by corresponding target logical storage devices. For example, these embodiments can prevent file system signature issues that might otherwise arise when two different device identifiers for respective source and target devices are detected as having the same file system signature, leading a host device to mark one of them as a copy of the other. Instead, one or more such embodiments are illustratively configured to ensure that one or more applications executing on the host device each effectively continues to see a source logical storage device as a single device, even after completion of the migration of the source logical storage device to a target logical storage device, until such time as a host device reboot and/or a file system remount allows the file system to read the identifier of the target logical storage device as a single device rather than as a copy of another device and to generate a file system signature for the target logical storage device.

In one embodiment, an apparatus comprises at least one processing device comprising a processor coupled to a memory. The processing device is configured to control performance of a migration process in which a source logical storage device of a first storage system is migrated to a target logical storage device of a second storage system. In conjunction with the migration process, the processing device is further configured to update a management header of the target logical storage device to include an identifier of the target logical storage device, to store an identifier of the source logical storage device, and responsive to a read of the management header of the target logical storage device, to return the identifier of the source logical storage device in place of the identifier of the target logical storage device.

The management header of the target logical storage device may comprise, for example, a logical volume management header located at a designated logical block address of the target logical storage device.

In some embodiments, storing an identifier of the source logical storage device comprises storing a logical volume management header of the source logical storage device in a storage location separate from the target logical storage device, with the logical volume management header of the source logical storage device including the identifier of the source logical storage device.

Returning the identifier of the source logical storage device in place of the identifier of the target logical storage device in some embodiments can advantageously resolve a file system signature issue that would otherwise arise if the identifier of the target logical storage device were returned responsive to the read.

The processing device in some embodiments illustratively comprises a host device that is configured to communicate with the first and second storage systems over a network. The host device implements a multi-path input-output (MPIO) driver configured to control delivery of IO operations from the host device to the first and second storage systems over selected paths through the network.

The MPIO driver in such an embodiment is illustratively configured to carry out at least a portion of the migration process. The MPIO driver may be further configured to perform at least a portion of the updating of the management header, the storing of the identifier of the source logical storage device, and the returning of the identifier of the source logical storage device in place of the identifier of the target logical storage device.

The MPIO driver in these and other embodiments is illustratively implemented as part of a multi-path layer provided by one or more host devices, such as multiple host devices that share the first and second storage systems.

In some embodiments, the target logical storage device is known by its target identifier to the MPIO driver of the host device but is not known by its target identifier to one or more applications executing on the host device. The MPIO driver in arrangements of this type is illustratively configured to mediate between the one or more applications and the target logical storage device so as to allow the one or more applications to use the identifier of the source logical storage device in place of the identifier of the target logical storage device even after completion of the migration process.

The returning of the identifier of the source logical storage device in place of the identifier of the target logical storage device is illustratively repeated for each of a plurality of additional reads of the management header of the target logical storage device after completion of the migration process.

For example, the returning of the identifier of the source logical storage device in place of the identifier of the target logical storage device may be repeated for each of a plurality of additional reads of the management header of the target logical storage device until a reboot, remount and/or other similar operation involving a file system of a host device allows the file system to read the identifier of the target logical storage device from the updated management header of the target logical storage device and to generate a file system signature for the target logical storage device.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
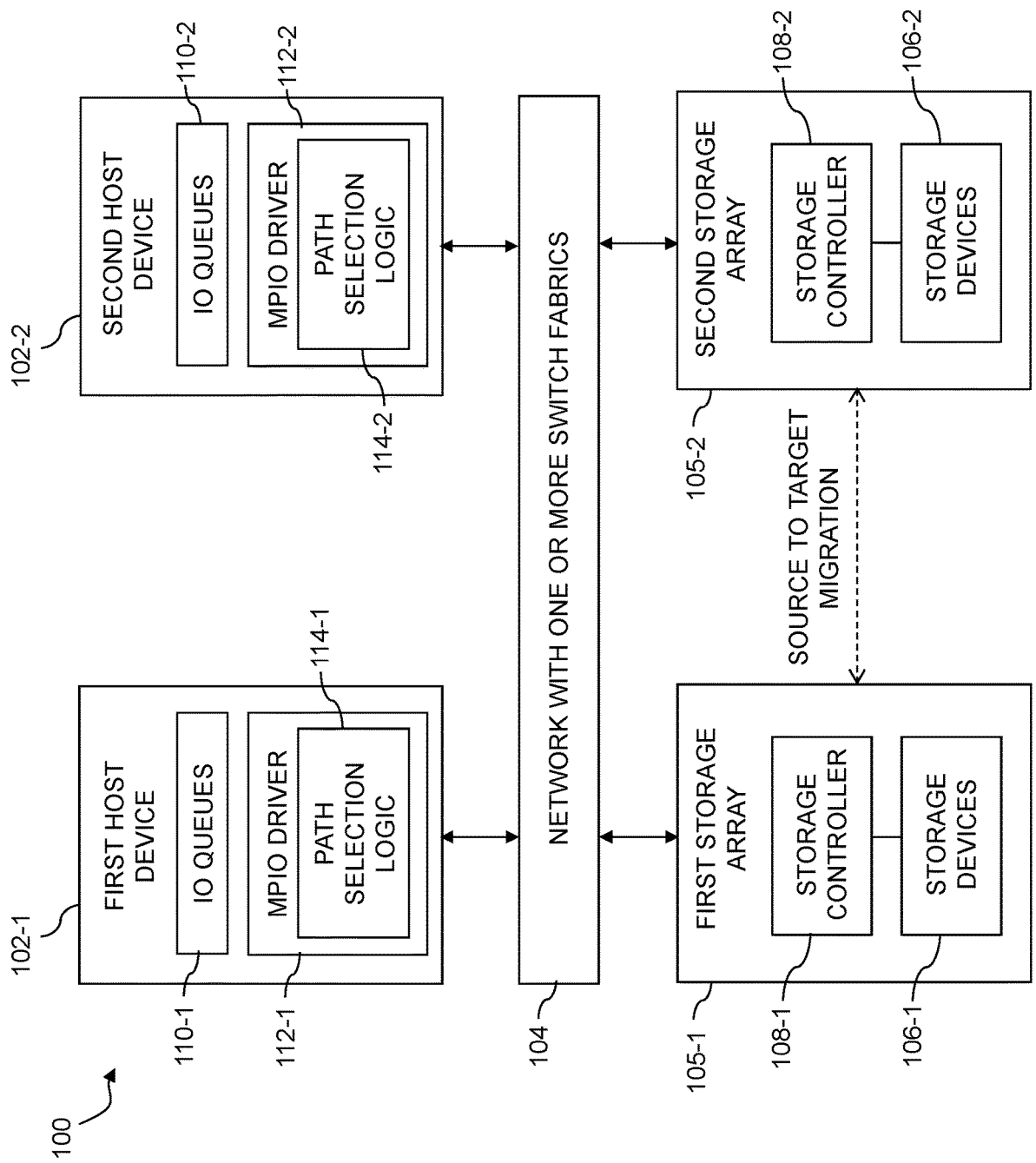
FIG. 1 is a block diagram of an information processing system configured with functionality for signature issue resolution in automated seamless migration utilizing a multi-path layer of a host device in an illustrative embodiment.

FIG. 1 shows an information processing system 100 configured in accordance with an illustrative embodiment. The information processing system 100 comprises at least first and second host devices 102-1 and 102-2, collectively referred to herein as host devices 102. The host devices 102 are coupled to a network 104 that comprises one or more switch fabrics. The host devices 102 communicate over the network 104 via the one or more switch fabrics with at least first and second storage arrays 105-1 and 105-2, collectively referred to herein as storage arrays 105. For example, the network 104 illustratively comprises at least one storage area network (SAN) and the one or more switch fabrics illustratively comprise respective distinct switch fabrics of a set of multiple switch fabrics interconnecting the host devices 102 with the storage arrays 105 over the one or more SANs. Each of the one or more switch fabrics in some embodiments is associated with a different SAN.

The system 100 may be configured such that the first host device 102-1 communicates with the first storage array 105-1 over a first switch fabric and communicates with the second storage array 105-2 over a second switch fabric. Similarly, the second host device 102-2 can communicate with the first storage array 105-1 over the first switch fabric and communicate with the second storage array 105-2 over the second switch fabric. Numerous other interconnection arrangements are possible.

Also, other types of networks can be used in other embodiments, and references to SANs, switch fabrics or other particular network arrangements herein are for purposes of illustration only, as non-limiting examples.

Although only two host devices 102 and two storage arrays 105 are shown in the figure, this is by way of illustrative example only, and other embodiments can include additional instances of such elements. It is also possible that alternative embodiments may include only a single host device.

The host devices 102 illustratively comprise respective computers, servers or other types of processing devices configured to communicate with the storage arrays 105 over the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 may be implemented using multiple networks of different types to interconnect the various components of the information processing system 100. For example, the network 104 may comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) and/or other types of communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although illustratively shown as separate from the network 104 in the figure, at least portions of the storage arrays 105 may be considered part of the network 104 in some embodiments. For example, in embodiments in which the network 104 comprises at least one SAN, the storage arrays 105 may be viewed as part of the one or more SANs.

The storage arrays 105-1 and 105-2 comprise respective sets of storage devices 106-1 and 106-2, collectively referred to herein as storage devices 106, coupled to respective storage controllers 108-1 and 108-2, collectively referred to herein as storage controllers 108.

The storage devices 106 of the storage arrays 105 illustratively comprise solid state drives (SSDs). Such SSDs in some embodiments are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of storage devices may also be used. For example, hard disk drives (HDDs) can be used in combination with or in place of SSDs or other types of NVM devices.

A given storage system as the term is broadly used herein can therefore include a combination of different types of storage devices, as in the case of a multi-tier storage system comprising, for example, a memory-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives, NVM drives or other types of SSDs while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, NVM drives, hybrid drives or other types of storage devices.

In some embodiments, at least one of the storage arrays 105 illustratively comprises one or more VNX®, VMAX®, Unity™ or PowerMax™ storage arrays, commercially available from Dell EMC of Hopkinton, Mass.

As another example, one or both of the storage arrays 105 may comprise respective clustered storage systems, each including a plurality of storage nodes interconnected by one or more networks. An example of a clustered storage system of this type is an XtremIO™ storage array from Dell EMC, illustratively implemented in the form of a scale-out all-flash content addressable storage array.

A given storage system as the term is broadly used herein can additionally or alternatively comprise, for example, network-attached storage (NAS), direct-attached storage (DAS) and distributed DAS.

Other additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

As mentioned above, communications between the host devices 102 and the storage arrays 105 within the system 100 may utilize PCIe connections or other types of connections implemented over one or more networks such as network 104. For example, illustrative embodiments can use interfaces such as Small Computer System Interface (SCSI), Internet SCSI (iSCSI), Serial Attached SCSI (SAS) and Serial Advanced Technology Attachment (SATA). Numerous other interfaces and associated communication protocols can be used in other embodiments.

The storage arrays 105 in some embodiments may be implemented as part of cloud infrastructure in the form of a cloud-based system such as an Amazon Web Services (AWS) system. Other examples of cloud-based systems that can be used to provide at least portions of the storage arrays 105 and possibly other portions of system 100 include Google Cloud Platform (GCP) and Microsoft Azure.

As is apparent from the foregoing, terms such as "storage array" and "storage system" as used herein are intended to be broadly construed, and a given such storage array or storage system may encompass, for example, multiple distinct instances of a commercially-available storage array.

The storage devices 106 of the storage arrays 105 are configured to store data utilized by one or more applications running on one or more of the host devices 102. The storage devices 106 on one of the storage arrays 105 are illustratively arranged in one or more storage pools. The storage arrays 105 and their corresponding storage devices 106 are examples of what are more generally referred to herein as "storage systems." A given such storage system in the present embodiment may be shared by the host devices 102, and in such arrangements may be referred to as a "shared storage system."

The storage devices 106 of the storage arrays 105 implement logical units (LUNs) configured to store objects for users associated with the host devices 102. These objects can comprise files, blocks or other types of objects. The host devices 102 interact with the storage arrays 105 utilizing read and write commands as well as other types of commands that are transmitted over the network 104.

Such commands in some embodiments more particularly comprise SCSI commands, although other types of commands may be used in other embodiments, including commands that are part of a standard command set, or custom commands such as a "vendor unique command" or VU command that is not part of a standard command set.

A given IO operation as that term is broadly used herein illustratively comprises one or more such commands. References herein to terms such as "input-output" and "IO" should be understood to refer to input and/or output. Thus, an IO operation relates to at least one of input and output. For example, an IO operation can comprise at least one read IO operation and/or at least one write IO operation. More particularly, IO operations may comprise write requests and/or read requests directed to a given one of the storage arrays 105.

Each IO operation is assumed to comprise one or more commands for instructing at least one of the storage arrays 105 to perform particular types of storage-related functions such as reading data from or writing data to particular logical storage volumes or other logical storage devices of one or more of the storage arrays 105. Such commands are assumed to have various payload sizes associated therewith, and the payload associated with a given command is referred to herein as its "command payload."

A command directed by the host device 102-1 to one of the storage arrays 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

Also, the term "storage device" as broadly used herein can encompass, for example, a logical storage device such as a LUN or other logical storage volume. A logical storage device can be defined in the storage arrays 105 to include different portions of one or more physical storage devices. The storage devices 106 may therefore be viewed as comprising respective LUNs or other logical storage volumes. Logical storage devices are also referred to herein as simply "logical devices."

Each of the host devices 102 illustratively has multiple paths to each of the storage arrays 105 via the network 104, with at least one of the storage devices 106 of one of the storage arrays 105 being visible to that host device on a given one of the paths, although numerous other arrangements are possible. A given one of the storage devices 106 may be accessible to a given host device over multiple paths. Different ones of the host devices 102 can have different numbers and types of paths to the storage arrays 105.

Different ones of the storage devices 106 of the storage arrays 105 illustratively exhibit different latencies in processing of IO operations. In some cases, the same storage device may exhibit different latencies for different ones of multiple paths over which that storage device can be accessed from a given one of the host devices 102.

The host devices 102, network 104 and storage arrays 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

Additional examples of processing platforms utilized to implement storage systems and possibly one or more associated host devices in illustrative embodiments will be described in more detail below.

The host devices 102 and the storage arrays 105 may be implemented on respective distinct processing platforms, although numerous other arrangements are possible. For example, in some embodiments at least portions of the host devices 102 and the storage arrays 105 are implemented on the same processing platform. The storage arrays 105 can therefore be implemented at least in part within at least one processing platform that implements at least a subset of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 105. The storage arrays 105 can be similarly distributed across multiple data centers.

Although in some embodiments certain commands used by the host devices 102 to communicate with the storage arrays 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage arrays 105-1 and 105-2 in some embodiments may be arranged in an active-active configuration, although use of such a configuration is not required. In an example of an active-active configuration that may be used, data stored in one of the storage arrays 105 is replicated to the other one of the storage arrays 105 utilizing a replication process. Such data replication across the multiple storage arrays 105 can be used to facilitate failure recovery in the system 100. One of the storage arrays 105 may therefore operate as a production storage array relative to the other storage array which operates as a backup or recovery storage array. Examples of active-active configurations include "metro" or "stretched" high availability storage array configurations. The term "active-active configuration" as used herein is therefore intended to be broadly construed.

The storage arrays 105-1 and 105-2 may be configured to participate in a replication process, such as a synchronous replication process. In accordance with one type of synchronous replication process, a given one of the host devices 102 writes data to one of the storage arrays 105, and that host device receives an acknowledgement of success only after the data has been successfully written to both of the storage arrays 105. For example, if the host device directs a write to the first storage array 105-1, that storage array mirrors the write to the second storage array 105-2 and receives an acknowledgement of success back from the second storage array 105-2. The first storage array 105-1 then responds back to the host device with an acknowledgement of success.

This type of synchronous replication process is therefore configured to mirror data writes from one or more of the host devices 102 to both of the storage arrays 105. Other types of replication processes may be used in other embodiments.

For example, a "replication process" as that term is broadly used herein may include both asynchronous and synchronous replication modes as well as support for concurrent operation of such modes and separate operation of the individual modes. It is also possible in some embodiments that a given replication process implemented using storage arrays 105 may comprise only synchronous replication or only asynchronous replication, instead of multiple distinct replication modes.

It is assumed that the storage controllers 108 of the respective storage arrays 105 each comprise replication control logic and a snapshot generator. The replication control logic controls performance of the above-noted replication process. The snapshot generator can be used, for example, to generate snapshots of one or more storage volumes that are subject to synchronous replication in conjunction with active-active storage clustering, and in a wide variety of different migration scenarios.

The snapshots generated by the storage controllers 108 of the storage arrays 105 illustratively comprise respective point-in-time (PIT) replicas of the storage volumes. Multiple snapshots generated over time for a given storage volume can collectively comprise a "snapshot group" and information characterizing those snapshots in some embodiments is stored in the form of a snapshot tree or other arrangement of one or more data structures suitable for storing information characterizing a snapshot group. In some embodiments, a snapshot tree for a storage volume is configured to add a new node each time a new snapshot is generated for that storage volume. The term "snapshot" as used herein is intended to be broadly construed, and in some embodiments may encompass a complete PIT replica or other types of information characterizing the state of a given storage volume at a particular time.

A given storage volume designated for migration between storage arrays 105 in the system 100 illustratively comprises a set of one or more LUNs or other storage volumes of the storage arrays 105. Each such LUN or other storage volume is assumed to comprise at least a portion of a physical storage space of one or more of the storage devices 106 of the corresponding storage arrays 105.

The host devices 102 comprise respective sets of IO queues 110-1 and 110-2, and respective MPIO drivers 112-1 and 112-2. The MPIO drivers 112 collectively comprise a multi-path layer of the host devices 102. The multi-path layer provides automated path selection functionality using respective instances of path selection logic 114-1 and 114-2 implemented within the MPIO drivers 112.

In some embodiments, the multi-path layer additionally supports what is referred to herein as "automated seamless migration" of logical storage devices of the storage arrays 105. Such automated seamless migration functionality may be implemented at least in part in the multi-path layer, and may additionally or alternatively be implemented in migration control logic of the host devices 102 and storage arrays 105.

The MPIO drivers 112 may comprise, for example, otherwise conventional MPIO drivers, such as PowerPath® drivers from Dell EMC, suitably modified in the manner disclosed herein to support signature issue resolution in automated seamless migration of logical storage volumes. Other types of MPIO drivers from other driver vendors may be suitably modified to incorporate functionality for signature issue resolution in automated seamless migration as disclosed herein.

The MPIO driver 112-1 is configured to select IO operations from its corresponding set of IO queues 110-1 for delivery to the storage arrays 105 over the network 104. The sources of the IO operations stored in the set of IO queues 110-1 illustratively include respective processes of one or more applications executing on the host device 102-1. Other types of sources of IO operations may be present in a given implementation of system 100.

The paths over which the IO operations are sent from the host device 102-1 to the storage arrays 105 illustratively comprise paths associated with respective initiator-target pairs, with each initiator comprising a host bus adaptor (HBA) or other initiating entity of the host device 102-1 and each target comprising a storage array port or other targeted entity corresponding to one or more of the storage devices 106 of the storage arrays 105. As noted above, the storage devices 106 of the storage arrays 105 illustratively comprise LUNs or other types of logical storage devices.

For example, in selecting particular ones of the paths for delivery of the IO operations to the storage arrays 105, the path selection logic 114-1 of the MPIO driver 112-1 illustratively implements a path selection algorithm that selects particular ones of the paths at least in part as a function of path information such as host device HBA and storage array port, with the path selection algorithm being configured to balance the IO operations over the paths or to achieve other load balancing or performance goals.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of one of the storage arrays 105. The corresponding logical device illustratively comprises a LUN or other logical storage volume to which the particular IO operation is directed.

A given retry of a failed IO operation under such a path selection algorithm can select a path having a different host device HBA and storage array port for a given retry than that of the path selected for the original failed IO operation.

The paths between the host devices 102 and the storage arrays 105 can change over time. For example, the addition of one or more new paths from host device 102-1 to the storage arrays 105 or the deletion of one or more existing paths from the host device 102-1 to the storage arrays 105 may result from respective addition or deletion of at least a portion of the storage devices 106 of the storage arrays 105. Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage arrays 105 as well to discover the disappearance of any existing LUNs that have been deleted from the storage arrays 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the corresponding one of the storage arrays 105 that the host device 102-1 has discovered the new path.

As is apparent from the foregoing, MPIO driver 112-1 of host device 102-1 is configured to control delivery of IO operations from the host device 102-1 to the first and second storage arrays 105 over selected paths through the network 104.

The MPIO driver 112-1 is also configured to implement at least portions of automated seamless migration functionality of host device 102-1. Other host device components, such as migration control logic implemented in one or more host device processors, can additionally or alternatively implement aspects of the automated seamless migration functionality of the host device 102-1. The disclosed embodiments are therefore not limited to embodiments in which automated seamless migration functionality is controlled at least in part by an MPIO driver or multi-path layer.

As indicated previously, migration of logical storage volumes or other logical storage devices from one storage system to another storage system using conventional approaches can be problematic in certain contexts. For example, in automated seamless migration processes that do not implement spoofing of source logical storage device identifiers by corresponding target logical storage devices, file system signature issues can arise when two different device identifiers for respective source and target devices are detected as having the same file system signature, leading a host device to mark one of them as a copy of the other. Such file system signature issues of conventional approaches can negatively impact the migration process and thereby degrade overall system performance.

As will be described in more detail below, the FIG. 1 embodiment is advantageously configured to eliminate the problems that might otherwise arise in automated seamless migration processes that do not implement spoofing of source logical storage device identifiers by corresponding target logical storage devices. For example, this embodiment can prevent file system signature issues that might otherwise arise when two different device identifiers for respective source and target devices are detected as having the same file system signature, leading a host device to mark one of them as a copy of the other.

Instead, the MPIO drivers 112 are illustratively configured to ensure that one or more applications executing on the host device 102-1 each effectively continues to see a source logical storage device as a single device, even after completion of the migration of the source logical storage device to a target logical storage device, until such time as a host device reboot and/or a file system remount allows the file system to read the identifier of the target logical storage device as a single device rather than as a copy of another device and to generate a file system signature for the target logical storage device.

One example of a host-based migration process that does not utilize spoofing of source logical storage device identifiers by corresponding target logical storage devices is PowerPath® Migration Enabler (PPME). Host-based migration processes such as PPME avoid the complications associated with storage-based migration processes such as Non-Destructive Migration (NDM) that utilize device spoofing. More particularly, NDM and other storage-based migration processes typically require the target device to spoof the source device identifier or ID. This spoofing poses problems since the target device ID on the target array in some cases does not reflect the actual storage array on which the device resides. For example, if the storage array information is embedded in the device ID, and the target device is spoofing the source device by using the source device ID, the storage array information embedded in the spoofed device ID will indicate the source array and not the target array, even though the target device is located on the target array.

Host-based migration processes such as the above-noted PPME allow the target device to keep its own device ID, as an MPIO driver of a multi-path layer can merge the two device IDs into a single device ID for presentation to a host device processor layer, thereby avoiding the problems associated with spoofing. It should be noted that PPME can require close coordination between a host administrator and a storage administrator. For example, in some cases the storage administrator creates the target devices and performs associated zoning and masking operations, while the host administrator initiates performance of the corresponding migrations, although other arrangements are possible.

The above-noted file system signature issues that can arise when using PPME or other host-based migration processes that do not implement spoofing can negatively impact the migration process and thereby degrade overall system performance. However, as indicated previously, the automated seamless migration techniques of illustrative embodiments disclosed herein advantageously overcome file system signature issues that might otherwise arise when using host-based migration processes such as PPME, while also avoiding the need for spoofing of logical storage device identifiers.

In accordance with the automated seamless migration functionality, the host device 102-1 is configured to control performance of a migration process in which a source logical storage device of the first storage array 105-1 is migrated to a target logical storage device of the second storage array 105-2. For example, the migration process can be controlled in whole or in part by the MPIO driver 112-1 of the host device 102-1.

The MPIO driver 112-1 in such an embodiment illustratively causes a migration process to be performed in which data is copied from the source logical storage device to the target logical storage device.

The migration process can include, for example, a host-based migration process in which the first storage array 105-1 controls the copying of the data from the first storage array 105-1 to the second storage array 105-2, but with significant involvement of the host device 102-1 in the migration process. For example, the MPIO driver 112-1 of the host device 102-1 can initiate and otherwise control various aspects of the data copying. Other types of migration processes involving at least one of the host device 102-1 and the storage arrays 105 can be used in other embodiments.

In conjunction with the above-noted migration process, the MPIO driver 112-1 of the host device 102-1 is further configured to update a management header of the target logical storage device to include an identifier of the target logical storage device, to store an identifier of the source logical storage device, and responsive to a read of the management header of the target logical storage device, to return the identifier of the source logical storage device in place of the identifier of the target logical storage device.

These and other references to operations performed "in conjunction with" a migration process are intended to be broadly construed, so as to encompass, for example, operations that are performed at least in part during a migration process, at initiation of a migration process or at completion of a migration process.

In some embodiments, returning the identifier of the source logical storage device in place of the identifier of the target logical storage device advantageously resolves a file system signature issue that would otherwise arise if the identifier of the target logical storage device were returned responsive to the read. The read illustratively comprises a read operation generated by an application running on the host device 102-1, but the term "read" as used in this context and similar contexts elsewhere herein is intended to be broadly construed so as to encompass numerous other arrangements.

Also, although reference is made above to migration of a source logical storage device to a target logical storage device, multiple source logical storage devices may be migrated within the same migration process to respective multiple target logical storage devices. For example, the source logical storage device is illustratively one of multiple source logical storage devices of a source data store that are migrated to respective multiple target logical storage devices of a target data store in the migration process.

The MPIO driver 112-1 is illustratively configured to perform at least a portion of the updating of the management header, the storing of the identifier of the source logical storage device, and the returning of the identifier of the source logical storage device in place of the identifier of the target logical storage device. In other embodiments, these operations can be performed elsewhere in the host device 102-1.

The target logical storage device is illustratively known by its target identifier to the MPIO driver 112-1 of the host device 102-1, but is not known by its target identifier to one or more applications executing on the host device 102-1. Instead, the MPIO driver 112-1 is configured to mediate between the one or more applications and the target logical storage device so as to allow the one or more applications to use the identifier of the source logical storage device in place of the identifier of the target logical storage device, during and even after completion of the migration process.

The management header of the target logical storage device in some embodiments more particularly comprises a logical volume management (LVM) header located at a designated logical block address of the target logical storage device, although other types of management headers can be used, and the term "management header" as used herein is therefore intended to be broadly construed.

In embodiments in which the management header of the target logical storage device is associated with a file system signature, updating the management header of the target logical storage device to include the identifier of the target logical storage device illustratively comprises verifying the file system signature, and verifying that the management header comprises the identifier of the source logical storage device copied from the source logical storage device in conjunction with the migration process. These verifying steps are illustratively performed prior to updating the management header of the target logical storage device to include the identifier of the target logical storage device.

Additionally or alternatively, updating the management header of the target logical storage device to include the identifier of the target logical storage device illustratively comprises reading the identifier of the target logical storage device from the second storage array 105-2, and performing an atomic update operation on the management header to incorporate the identifier of the target logical storage device as read from the second storage array 105-2 into the management header.

In some embodiments, reading the identifier of the target logical storage device from the second storage array 105-2 comprises reading the identifier of the target logical storage device by issuing a command to access a designated page of the second storage array 105-2 containing information characterizing the target logical storage device. The command can include, for example, an inquiry command, a mode sense command, or other types of SCSI or VU commands. As a more particular example, a SCSI inquiry ("Inq") command can be used to access a particular page of information, illustratively page 83 information that includes the identifier of the target logical storage device.

The above-noted storing of an identifier of the source logical storage device in some embodiments more particularly comprises storing an LVM header of the source logical storage device in a storage location separate from the target logical storage device, with the LVM header of the source logical storage device including the identifier of the source logical storage device. Accordingly, the identifier of the source logical storage device is not stored on the target logical storage device. For example, it can be stored in a designated location in the host device 102-1, or in one or both of the storage arrays 105, or possibly in multiple locations, each separate from the target logical storage device.

The returning of the identifier of the source logical storage device in place of the identifier of the target logical storage device is illustratively repeated by the MPIO driver 112-1 for each of a plurality of additional reads of the management header of the target logical storage device after completion of the migration process.

For example, the returning of the identifier of the source logical storage device in place of the identifier of the target logical storage device is repeated for each of a plurality of additional reads of the management header of the target logical storage device until a reboot and/or remount operation involving a file system of the host device 102-1 allows the file system to read the identifier of the target logical storage device from the updated management header of the target logical storage device. A file system signature can then be generated for the target logical storage device.

Such features are examples of what is more generally referred to herein as "automated seamless migration" of logical storage devices. Illustrative embodiments are "automated" in that the migration process is automatically carried out under the control of the MPIO driver 112-1 with involvement of other system components, and are also "seamless" in that each host device seamlessly transitions from usage of the source logical storage device to usage of the target logical storage device at an appropriate time, without the need for any synchronization between multiple host devices. Other advantages are provided by other automated seamless migration arrangements in other embodiments.

In some embodiments, the source logical storage device comprises a non-paired or "local only" logical device and the destination logical device comprises a paired logical device. Such a paired logical device is illustratively established in accordance with an active-active configuration of the first and second storage arrays 105, and is identified by the MPIO driver 112-1 as a single logical device but has separate corresponding logical devices on the respective first and second storage arrays. Migration from a non-paired logical device to a paired logical device can be implemented, for example, in order to achieve a high availability arrangement for the data of the migrated logical device, with the migrated logical device being accessible on both of the storage arrays 105. These and numerous alternative data movement scenarios or more generally other types of migration scenarios can be similarly configured to utilize automated seamless migration techniques as disclosed herein.

The above-described functions associated with automated seamless migration functionality of the host device 102-1 are illustratively carried out at least in part utilizing the MPIO driver 112-1 and its path selection logic 114-1. For example, in some embodiments, the automated seamless migration functionality can be implemented substantially entirely under the control of the MPIO driver 112-1, and in such embodiments the MPIO driver 112-1 is illustratively configured to control performance of the steps of the flow diagram to be described below in conjunction with FIG. 2. Additional or alternative host device components, such as migration control logic implemented in the host device, can be used to control performance of an automated seamless migration process such as that of FIG. 2.

It is assumed that the other MPIO driver 112-2 is configured in a manner similar to that described above and elsewhere herein for the first MPIO driver 112-1. The MPIO driver 112-2 is therefore similarly configured to select IO operations from its corresponding one of the sets of IO queues 110 for delivery to the storage arrays 105 over the network 104 and to perform at least portions of the disclosed automated seamless migration functionality. Accordingly, aspects of automated seamless migration functionality described above in the context of the first MPIO driver 112-1 and the first host device 102-1 are assumed to be similarly performed by the other MPIO driver 112-2 and the other host device 102-2.

The MPIO drivers 112 may be otherwise configured utilizing well-known MPIO functionality such as that described in "Dell EMC SC Series Storage and Microsoft Multipath I/O," Dell EMC, CML1004, July 2018, which is incorporated by reference herein. Such conventional MPIO functionality is suitably modified in illustrative embodiments disclosed herein to support automated seamless migration.

It is to be appreciated that the above-described features of system 100 and other features of other illustrative embodiments are presented by way of example only, and should not be construed as limiting in any way. Accordingly, different numbers, types and arrangements of system components such as host devices 102, network 104, storage arrays 105, storage devices 106, sets of IO queues 110, MPIO drivers 112 and instances of path selection logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. For example, as indicated previously, instances of migration control logic implemented in the host devices 102 and the storage arrays 105 can be used to perform at least portions of the automated seamless migration functionality.

The operation of the information processing system 100 will now be described in further detail with reference to the flow diagram of the illustrative embodiment of FIG. 2. The process as shown includes steps 200 through 214, and is suitable for use in the system 100 but is more generally applicable to other types of systems comprising one or more host devices and first and second storage systems. The first and second storage systems in this embodiment are assumed to comprise respective first and second storage arrays, possibly but not necessarily arranged in an active-active configuration, with each storage array comprising a plurality of storage devices. The storage devices of the first and second storage arrays are assumed to include logical storage devices such as LUNs or other logical storage volumes. The source and target logical storage devices in this embodiment are referred to as simply "source" and "target" devices, and the host device is also referred to as simply a "host."

Figure 2:
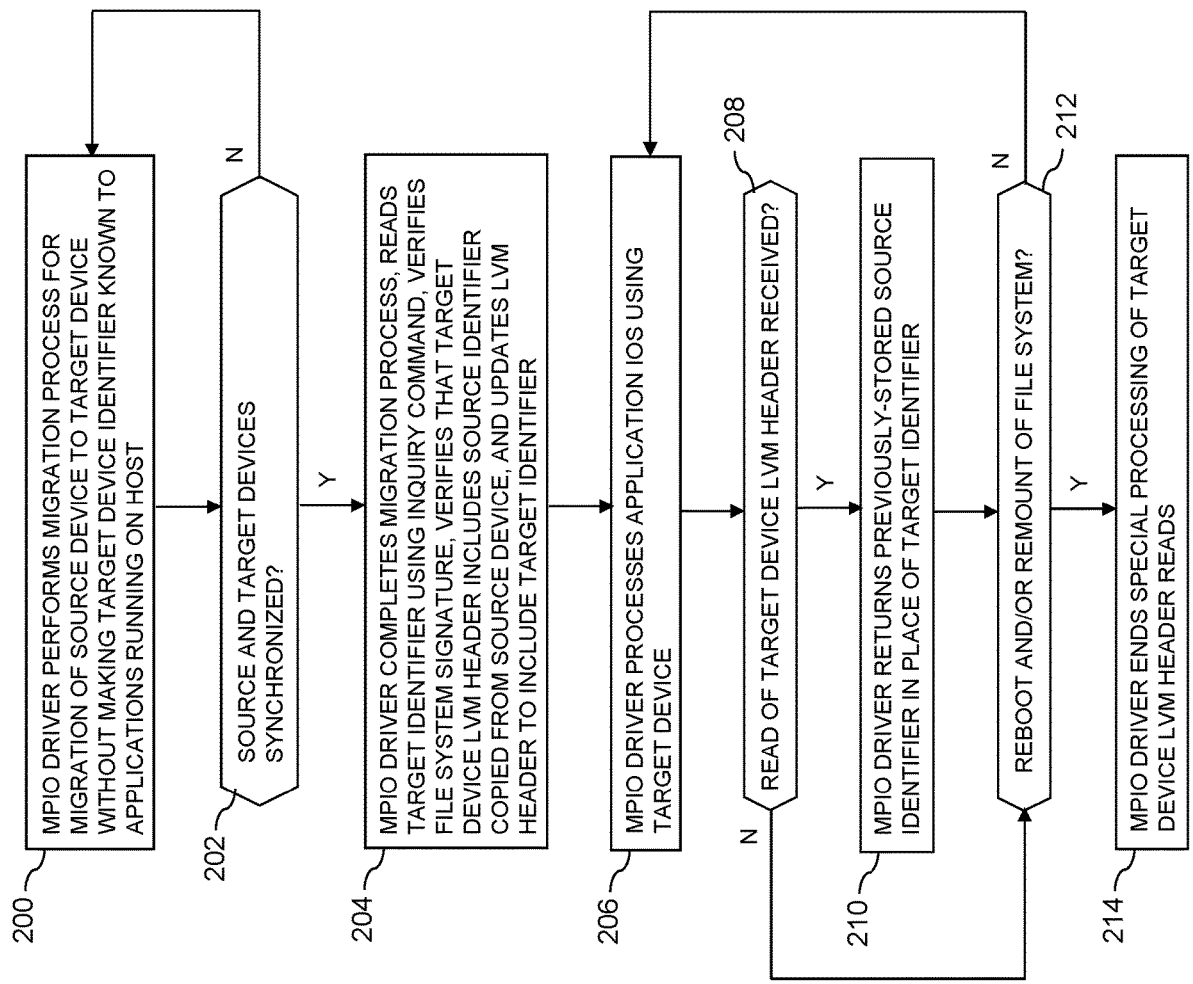
FIG. 2 is a flow diagram of a process for signature issue resolution in automated seamless migration utilizing a multi-path layer of a host device in an illustrative embodiment.

The steps of the FIG. 2 process are illustratively performed primarily by or under the control of an MPIO driver of a given host device, such as the MPIO driver 112-1 of the first host device 102-1 of system 100, although other arrangements of system components can perform at least portions of one or more of the steps in other embodiments. The functionality of the FIG. 2 process is illustratively performed at least in part in conjunction with a load balancing algorithm or other type of path selection algorithm executed by the path selection logic 114-1 of the MPIO driver 112-1.

In step 200, the MPIO driver in the first host device performs a migration process for migration of a source device to a target device without making an identifier of the target device known to applications running on the host. The source and target devices illustratively comprise respective logical storage devices on respective ones of the first and second storage arrays, although other arrangements are possible.

In step 202, a determination is made by the MPIO driver as to whether or not the source and target devices are synchronized in the first and second storage arrays as part of the migration process. If the source and target devices are synchronized, the process moves to step 204, and otherwise returns to step 200 as indicated.

In step 204, the MPIO driver completes the migration process, reads the target identifier using an inquiry command, verifies the file system signature, verifies that the target device LVM header includes source identifier copied from the source device, and updates the target device LVM header to include the target identifier.

In step 206, the MPIO driver processes IO operations from applications executing on the host, using the target device. The MPIO driver processes these IO operations using the target device, although the applications illustratively believe they are still interacting with the source device. Accordingly, in this embodiment, the target device is known by its target identifier to the MPIO driver of the host but is not known by its target identifier to one or more applications executing on the host. The MPIO driver is therefore configured to mediate between the one or more applications executing on the host and the target device so as to allow the one or more applications to use the identifier of the source device in place of the identifier of the target device even after completion of the migration process.

In step 208, a determination is made by the MPIO driver as to whether or not a read of the target device LVM header has been received. If a read of the target device LVM header has been received, the process moves to step 210, and otherwise the process skips step 210 and moves to step 212 as indicated.

In step 210, which is reached after receipt of a read of the target device LVM header, the MPIO driver returns a previously-stored source identifier in place of the target identifier. The process then moves to step 212.

In step 212, a determination is made by the MPIO driver as to whether or not a reboot and/or a remount of the host file system has occurred since completion of the migration of the source device to the target device. If a reboot and/or remount of the host file system has occurred since completion of the migration of the source device to the target device, the process moves to step 214, and otherwise the process returns to step 206 to continue processing IO operations using the target device as indicated.

In step 214, the MPIO driver ends the special processing of target device LVM header reads as indicated. The special processing includes the performance of steps 208 and 210. Accordingly, after a reboot and/or remount of the host file system, the MPIO driver no longer returns the previously-stored source identifier in place of the target identifier for any reads of the target device LVM header, but instead allows those reads to be processed in the normal manner without such special processing.

After all host devices have committed to the target device, the source device can be removed or otherwise deleted from the system.

Although not explicitly indicated in the figure, the process at this point can return to step 200 to perform an additional migration process.

Different instances of the FIG. 2 process can execute at least in part in parallel with one another for different pairs of source and target devices. For example, multiple source devices of a source data store can be migrated to respective multiple target devices of a target data store using respective instances of the FIG. 2 process.

Additionally or alternatively, multiple additional instances of the FIG. 2 process can be performed in respective ones of one or more additional host devices that share the first and second storage arrays.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and automated seamless migration functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different automated seamless migration arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
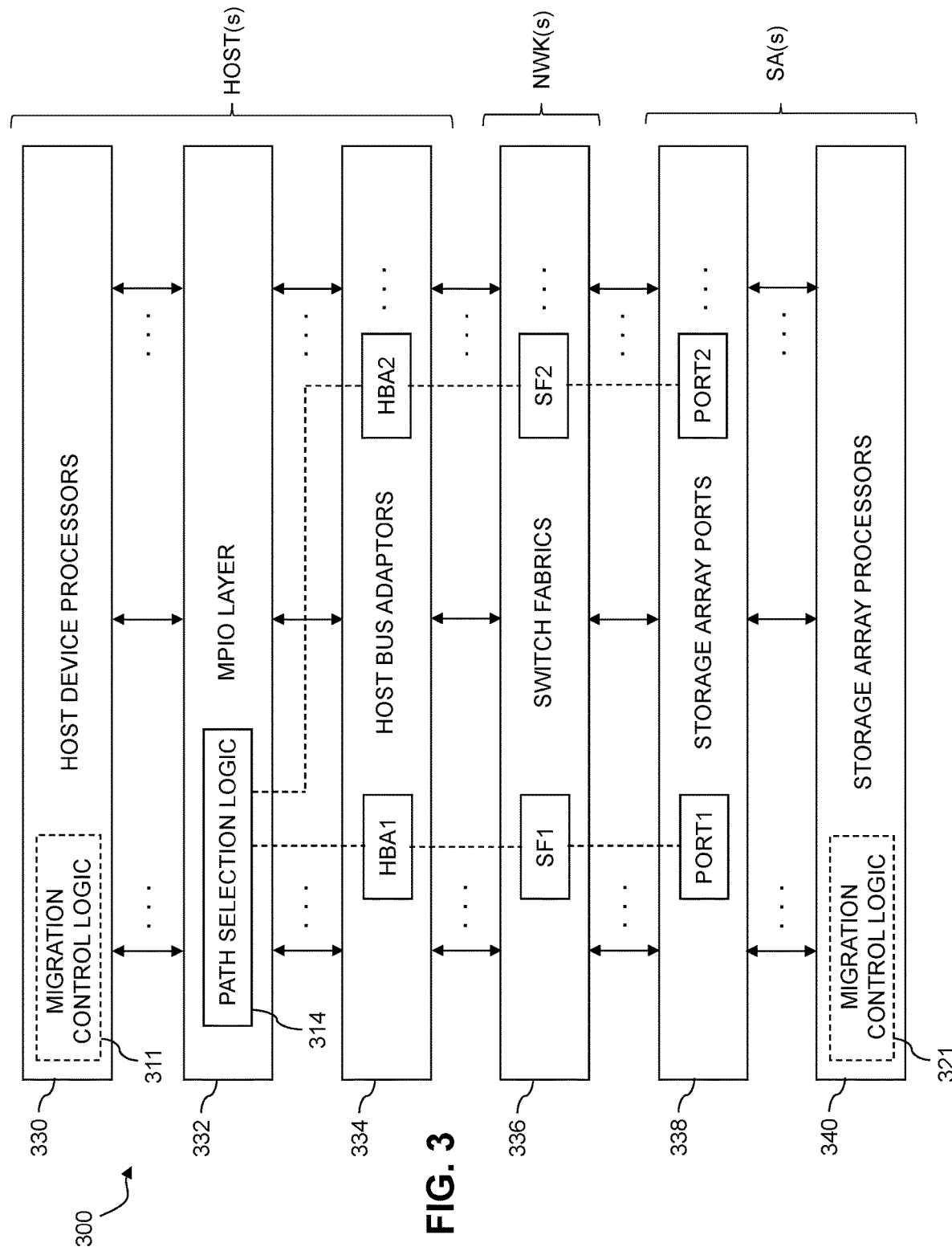
FIG. 3 is a block diagram showing multiple layers of a layered system architecture that includes a multi-path layer with automated seamless migration functionality in an illustrative embodiment.

Referring now to FIG. 3, another illustrative embodiment is shown. In this embodiment, an information processing system 300 comprises host-side migration control logic 311, path selection logic 314 and storage-side migration control logic 321. The system 300 is configured in accordance with a layered system architecture that illustratively includes a host device processor layer 330, an MPIO layer 332, an HBA layer 334, a switch fabric layer 336, a storage array port layer 338 and a storage array processor layer 340. As illustrated in the figure, the host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements automated seamless migration of logical storage volumes or other logical storage devices. The logical storage devices store data for one or more application processes running in one or more host device processors of the host device processor layer 330. The automated seamless migration functionality in this embodiment is assumed to be controlled at least in part by host-side migration control logic 311, path selection logic 314 of the MPIO layer 332, and storage-side migration control logic 321, although other arrangements are possible.

The host-side migration control logic 311 implemented in the host processor layer 330 controls host-based migration processes of the system 300. The migration control logic 311 can include multiple distinct migration control logic instances for respective ones of a plurality of host devices of the system 300.

The storage-side migration control logic 321 implemented in the storage array processor layer 340 controls storage-based migration processes of the system 300. The migration control logic 321 can include multiple distinct migration control logic instances for respective ones of a plurality of storage arrays of the system 300.

The host-side and storage-side migration control logic 311 and 321 are illustratively configured to implement at least portions of the functionality for signature issue resolution in automated seamless migration of logical storage devices as disclosed herein. These components are shown in dashed outline in the figure, as they can be implemented in different locations within the system 300, or in a distributed manner across multiple locations. For example, the host-side migration control logic 311, although illustratively shown as part of the host processor layer 330, can be implemented at least in part in the MPIO layer 332. As another example, the storage-side migration control logic 321, although illustratively shown as part of the storage array processor layer 340, can be implemented at least in part in the storage array port layer 338.

The MPIO layer 332 is an example of what is also referred to herein as a multi-path layer, and comprises one or more MPIO drivers implemented in respective host devices. Each such MPIO driver illustratively comprises an instance of path selection logic 314 configured to perform path selection for delivery of JO operations to the storage arrays of system 300 as previously described. The path selection logic 314 in some embodiments operates in conjunction with the host-side and storage-side migration control logic 311 and 321 in implementing at least portions of the functionality for signature issue resolution in automated seamless migration of logical storage devices as disclosed herein. Additional or alternative layers, migration control logic and path selection logic arrangements can be used in other embodiments.

In the system 300, path selection logic 314 is configured to select different paths for sending JO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment therefore selects paths for delivery of IO operations to the one or more storage arrays having the storage array ports of the storage array port layer 338.

In this illustrative embodiment, the host devices and storage arrays of system 300 through their respective instances of migration control logic 311 or 321 provide functionality for signature issue resolution in automated seamless migration, possibly with involvement of other host device or system components, such as the path selection logic 314 of MPIO layer 332.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Another example of an automated seamless migration process implemented utilizing an MPIO layer such as MPIO layer 332 of the FIG. 3 embodiment will now be described in more detail. In this example, automated seamless migration of a source logical storage device of a first storage array to a target logical storage device of a second storage array is provided. The source and target logical storage devices are referred to as simply source and target devices in the following description. Similarly, the first and second storage arrays are also referred to as respective source and target arrays.

As indicated previously, problems can arise relating to file system signature discrepancies when performing migration using certain types of host devices, such as ESX servers and other particular server types.

It will be assumed for the present example that the host devices comprise respective ESX servers commercially available from VMware, and that the ESX servers utilize Virtual Machine File System (VMFS) also from VMware. VMFS is a cluster file system that facilitates storage virtualization for multiple ESX servers. It is to be appreciated, however, that references herein to particular host device and host file system types, such as ESX servers and VMFS, are presented for purposes of illustration only. A wide variety of other types of host devices and host file systems can be used in other embodiments.

In some embodiments, VMFS generates a file system signature (e.g., a VMFS volume signature) for a given logical storage device of a storage array. This illustratively involves reading the logical storage device ID using an Inq page 83 command, and writing the logical storage device ID to the logical storage device in an area referred to as a VMFS header. Here, Inq page 83 denotes a particular SCSI command used to determine the device ID, although other commands can be used in other embodiments.

A file system signature issue can arise in this context when a source device is migrated to a target device without the use of spoofing, for example, using the above-noted PPME, because the source and target devices each maintain their respective device IDs but have the same file system signature due to copying of the source device to the target device. Accordingly, the target device will have a discrepancy between its target ID as returned responsive to the Inq page 83 command, and its "on-disk" VMFS header information including the file system signature. An ESX server that detects this condition will mark the device with the discrepancy as a copy, which makes that device unusable for many operations. This file system signature issue is an example of what is more generally referred to herein as a "signature issue" that is resolved using the disclosed techniques.

Illustrative embodiments advantageously resolve such signature issues in a particularly efficient manner. In the present example, an MPIO driver that controls the performance of the automated seamless migration (e.g., using PPME) is configured to ensure that none of the ESX servers will detect a discrepancy and declare the target device a copy of the source device, and that the ESX servers will instead continue to operate, effectively using the target device after migration as if it were still identified as the source device, until such time that an ESX reboot and/or a VMFS remount causes a new file system signature to be generated from the target device ID as read from the target device using the Inq page 83 command.

The process in the present example comprises an algorithm performed by multiple host devices and the source and target arrays, with the host devices utilizing their respective MPIO drivers. It is assumed that each of the host devices that interacts with a source logical storage device to be migrated separately performs the host device portions of the process. For simplicity of description, the description of the example algorithm below will refer to migration of a single source device to a single target device, but it is to be understood that the disclosed techniques encompass migration of multiple source devices to respective multiple target devices. For example, VMFS generally requires that, in order to maintain appropriate device grouping, all storage devices that belong to a given VMFS data store must be migrated together, illustratively from a source data store to a target data store.

The process includes the following steps:

1. The source array comprises a source logical storage device ("source device"). Applications on the host devices are performing IO with the source device.

2. The target array comprises a target logical storage device ("target device"). It is assumed that the source device is to be migrated to the target device, and that the target device has the same or a larger storage capacity than the source device.

3. An MPIO driver of a given host device reads the VMFS header of the source device and stores it in a memory or other storage location accessible to the MPIO driver. As noted above, the VMFS header of the source device includes the file system signature (e.g., a VMFS volume signature) for the source device.

4. A host administrator responsible for the host devices will identify the target device to the MPIO driver, as the particular device on the target array to which the source device will be migrated in a migration process controlled by the MPIO driver.

5. The MPIO driver does not make the target device visible to VMFS or to applications running on the host device. Accordingly, at this stage of the process and throughout the migration, VMFS and the applications will not attempt to use the target device, and the host device will not detect any discrepancy of the type described above, between the target device ID and the VMFS signature of the target device.

6. The MPIO driver executes automated seamless migration, illustratively including data copying and write mirroring, until the source and target devices are synchronized, at which point the migration completes.

7. The MPIO driver transitions from the source device to the target device as follows:

(a) The MPIO driver reads the Inq page 83 data of the target device.

(b) The MPIO driver reads and validates the LVM header located at logical block address (LBA) offset 0x1000 on the target device (which now has the data copied from the source device). The LVM header illustratively has a length of one LBA block. This step involves validating that the location being read belongs to an LVM header by verifying the VMFS signature at 0x0dd0, and then validating that the LVM header includes the device identifier of the source device. The latter verification ensures that the process will not update a logical device that was not migrated from the source device.

(c) The MPIO driver updates the LVM header on the target device with the target device identifier. The target device identifier in the LVM header is illustratively given by a combination of target device WWN and at least a portion of target device PID, such as, for example, LUN_WWN+LUN_PID, where LUN denotes the target device, WWN denotes a world-wide name of the target device, and PID denotes a product identifier of the target device. The MPIO driver creates a new LVM header using the Inq page 83 data read from the target device, illustratively including the WWN and PID. This involves copying the target device Inq page 83 WWN and PID, and updating the device identifier length in the LVM header. The LVM header on the target device is updated atomically (e.g., using a compare and write command), so as to avoid conflicts between multiple hosts attempting to update simultaneously in a shared storage environment.

(d) The MPIO driver saves the original source device LVM header, illustratively on at least one of the source and target storage arrays, and/or on the host device.

(e) The MPIO driver uses the target device in place of the source device to service IOs from the applications. The target device is made accessible to the host and the source device is made inaccessible to the host.

(f) After the LVM header at LBA 0x1000 of the target device is updated with the target device identifier, subsequent reads to the LVM header of the target device will cause the MPIO driver to return the saved source device LVM header in place of the target device LVM header. The MPIO driver will continue returning the saved source device LVM header in place of the target device LVM header until the host is rebooted and/or the VMFS is remounted, so as to prevent host device detection of a discrepancy of the type previously described. In conjunction with such a reboot and/or remount event, the rebooted and/or remounted VMFS will read the updated LVM header from LBA 0x1000 of the target device, which now matches the target device identifier.

In the above example process, the applications will continue to run uninterrupted on the host, without any file system signature issues arising from the migration of the source device to the target device, due to the MPIO driver returning the source device LVM header in place of the target device LVM header for any reads of the target device LVM header that it receives. This continues until the occurrence of a reboot and/or remount event, at which point the file system signature of the target device is updated and reads of the target device LVM header are once again processed in the normal manner.

In some implementations of the above process, the MPIO driver performs the described functionality only if VMFS and the MPIO driver have consistent code versions. For example, it is possible that issues may arise if VMFS were updated to use a different LBA for the LVM header, but the MPIO driver were not aware of this update. Accordingly, some embodiments require certain code version compliance between VMFS and the MPIO driver. As indicated previously, VMFS is only an example, and other types of file systems and host device types can be used in other embodiments.

The MPIO driver portions of the above process may also be performed by other MPIO drivers on respective other host devices.

The above process is presented by way of illustrative example only, and other embodiments can utilize additional or alternative steps. Also certain steps illustrated as being performed serially can instead be performed at least in part in parallel with one another.

Similar issues can arise in contexts other than ESX, such as with other servers implemented using other operating systems. Illustrative embodiments can be adapted in a straightforward manner to address file system signature issues and other signature issues that can arise in these and other host device contexts.

The process in the above example illustratively resolves file system signature issues, while also avoiding the need for spoofing of logical storage device identifiers.

Some embodiments include only a single host device, although multiple host devices are used in illustrative embodiments. For example, a single host device can be connected to two storage arrays that are arranged in an active-active configuration.

Also, it should be noted that the host devices in a given embodiment need not be in an active-active configuration. For example, multiple host devices can be arranged in a cluster and the host devices can be arranged in active-passive configurations, active-active configurations, or combinations thereof.

The particular automated seamless migration arrangements described above are presented by way of illustrative example only. Numerous alternative arrangements of these and other features can be used in implementing automated seamless migration in other embodiments.

The illustrative embodiments disclosed herein can provide a number of significant advantages relative to conventional arrangements. For example, some embodiments configure a host device comprising an MPIO driver to include functionality for signature issue resolution in automated seamless migration of logical storage volumes or other types of logical storage devices between storage arrays or other types of storage systems.

These embodiments can advantageously resolve file system signature issues while also avoiding the need for spoofing of logical storage device identifiers.

For example, these embodiments can prevent file system signature issues that might otherwise arise when two different device identifiers for respective source and target devices are detected as having the same file system signature, leading a host device to mark one of them as a copy of the other.

Instead, one or more such embodiments are illustratively configured to ensure that one or more applications executing on the host device each effectively continues to see a source logical storage device as a single device, even after completion of the migration of the source logical storage device to a target logical storage device, until such time as a host device reboot and/or file system remount allows the file system to read the identifier of the target logical storage device as a single device rather than as a copy of another device and to generate a file system signature for the target logical storage device.

Illustrative embodiments considerably facilitate data migration across storage arrays, leading to improved overall performance.

The disclosed functionality can be implemented using a wide variety of different storage arrays and other types of storage systems.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, GCP Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, network 104 and storage arrays 105 are illustratively implemented in the form of software running on one or more processing devices. As a more particular example, the instances of path selection logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, migration control logic and additional or alternative components. Also, the particular configurations of system and device elements and associated processing operations illustratively shown in the drawings can be varied in other embodiments. For example, a wide variety of different host device, MPIO driver and storage system configurations and associated automated seamless migration arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
    at least one processing device comprising a processor coupled to a memory;
    said at least one processing device being configured to control performance of a migration process in which a source logical storage device of a first storage system is migrated to a target logical storage device of a second storage system;
    wherein in conjunction with the migration process, said at least one processing device is further configured:
    to update a management header of the target logical storage device to include an identifier of the target logical storage device,
    to store an identifier of the source logical storage device, and
    responsive to a read of the management header of the target logical storage device, to return the identifier of the source logical storage device in place of the identifier of the target logical storage device.

2. The apparatus of claim 1 wherein returning the identifier of the source logical storage device in place of the identifier of the target logical storage device resolves a file system signature issue that would otherwise arise if the identifier of the target logical storage device were returned responsive to the read.

3. The apparatus of claim 1 wherein the source logical storage device is one of a plurality of source logical storage devices of a source data store that are migrated to respective target logical storage devices of a target data store in the migration process.

4. The apparatus of claim 1 wherein said at least one processing device comprises a host device that is configured to communicate with the first and second storage systems over a network, the host device implementing a multi-path input-output driver configured to control delivery of input-output operations from the host device to the first and second storage systems over selected paths through the network.

5. The apparatus of claim 4 wherein the multi-path input-output driver is further configured to carry out at least a portion of the migration process.

6. The apparatus of claim 4 wherein the multi-path input-output driver is further configured to perform at least a portion of the updating of the management header, the storing of the identifier of the source logical storage device, and the returning of the identifier of the source logical storage device in place of the identifier of the target logical storage device.

7. The apparatus of claim 4 wherein the target logical storage device is known by its target identifier to the multi-path input-output driver of the host device but is not known by its target identifier to one or more applications executing on the host device, and wherein the multi-path input-output driver is further configured to mediate between the one or more applications and the target logical storage device so as to allow the one or more applications to use the identifier of the source logical storage device in place of the identifier of the target logical storage device even after completion of the migration process.

8. The apparatus of claim 1 wherein the management header of the target logical storage device comprises a logical volume management header located at a designated logical block address of the target logical storage device.

9. The apparatus of claim 1 wherein the management header of the target logical storage device is associated with a file system signature and wherein updating the management header of the target logical storage device to include the identifier of the target logical storage device comprises:
    verifying the file system signature; and
    verifying that the management header comprises the identifier of the source logical storage device copied from the source logical storage device in conjunction with the migration process;

wherein the verifying steps are performed prior to updating the management header of the target logical storage device to include the identifier of the target logical storage device.

10. The apparatus of claim 1 wherein updating the management header of the target logical storage device to include the identifier of the target logical storage device comprises:
reading the identifier of the target logical storage device from the second storage system; and
performing an atomic update operation on the management header to incorporate the identifier of the target logical storage device as read from the second storage system into the management header.

11. The apparatus of claim 10 wherein reading the identifier of the target logical storage device from the second storage system comprises reading the identifier of the target logical storage device by issuing a command to access a designated page of the second storage system containing information characterizing the target logical storage device.

12. The apparatus of claim 1 wherein storing an identifier of the source logical storage device comprises storing a logical volume management header of the source logical storage device in a storage location separate from the target logical storage device and wherein the logical volume management header of the source logical storage device includes the identifier of the source logical storage device.

13. The apparatus of claim 1 wherein the returning of the identifier of the source logical storage device in place of the identifier of the target logical storage device is repeated for each of a plurality of additional reads of the management header of the target logical storage device after completion of the migration process.

14. The apparatus of claim 1 wherein the returning of the identifier of the source logical storage device in place of the identifier of the target logical storage device is repeated for each of a plurality of additional reads of the management header of the target logical storage device until a reboot or remount operation involving a file system of said at least one processing device allows the file system to read the identifier of the target logical storage device from the updated management header of the target logical storage device and to generate a file system signature for the target logical storage device.

15. A method comprising:
controlling performance of a migration process in which a source logical storage device of a first storage system is migrated to a target logical storage device of a second storage system; and
in conjunction with the migration process:
updating a management header of the target logical storage device to include an identifier of the target logical storage device,
storing an identifier of the source logical storage device, and
responsive to a read of the management header of the target logical storage device, returning the identifier of the source logical storage device in place of the identifier of the target logical storage device;
wherein the method is performed by at least one processing device comprising a processor coupled to a memory.

16. The method of claim 15 wherein the management header of the target logical storage device is associated with a file system signature and wherein updating the management header of the target logical storage device to include the identifier of the target logical storage device comprises:
verifying the file system signature; and
verifying that the management header comprises the identifier of the source logical storage device copied from the source logical storage device in conjunction with the migration process;
wherein the verifying steps are performed prior to updating the management header of the target logical storage device to include the identifier of the target logical storage device.

17. The method of claim 15 wherein updating the management header of the target logical storage device to include the identifier of the target logical storage device comprises:
reading the identifier of the target logical storage device from the second storage system; and
performing an atomic update operation on the management header to incorporate the identifier of the target logical storage device as read from the second storage system into the management header.

18. A computer program product comprising a non-transitory processor-readable storage medium having stored therein program code of one or more software programs, wherein the program code, when executed by at least one processing device comprising a processor coupled to a memory, causes said at least one processing device:
to control performance of a migration process in which a source logical storage device of a first storage system is migrated to a target logical storage device of a second storage system; and
in conjunction with the migration process:
to update a management header of the target logical storage device to include an identifier of the target logical storage device,
to store an identifier of the source logical storage device, and
responsive to a read of the management header of the target logical storage device, to return the identifier of the source logical storage device in place of the identifier of the target logical storage device.

19. The computer program product of claim 18 wherein the management header of the target logical storage device is associated with a file system signature and wherein updating the management header of the target logical storage device to include the identifier of the target logical storage device comprises:
verifying the file system signature; and
verifying that the management header comprises the identifier of the source logical storage device copied from the source logical storage device in conjunction with the migration process;
wherein the verifying steps are performed prior to updating the management header of the target logical storage device to include the identifier of the target logical storage device.

20. The computer program product of claim 18 wherein updating the management header of the target logical storage device to include the identifier of the target logical storage device comprises:
reading the identifier of the target logical storage device from the second storage system; and
performing an atomic update operation on the management header to incorporate the identifier of the target logical storage device as read from the second storage system into the management header.

* * * * *